US012659891B2

(12) United States Patent
Esswie

(10) Patent No.: US 12,659,891 B2
(45) Date of Patent: Jun. 16, 2026

(54) DYNAMIC CONFIGURATION OF SYNCHRONIZATION SIGNAL

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 506 days.

(21) Appl. No.: 18/176,490

(22) Filed: Mar. 1, 2023

(65) Prior Publication Data

US 2024/0298277 A1 Sep. 5, 2024

(51) Int. Cl.
*H04W 56/00* (2009.01)
*H04W 24/08* (2009.01)

(52) U.S. Cl.
CPC ......... *H04W 56/001* (2013.01); *H04W 24/08* (2013.01)

(58) Field of Classification Search
None
See application file for complete search history.

(56) References Cited

U.S. PATENT DOCUMENTS

| | | |
|---|---|---|
| 2019/0068348 A1 | 2/2019 | Nam |
| 2020/0084642 A1 | 3/2020 | Siomina et al. |
| 2020/0154446 A1 | 5/2020 | Yerramalli et al. |
| 2022/0015146 A1* | 1/2022 | Rune ................. H04B 7/06952 |

| | | |
|---|---|---|
| 2022/0225248 A1 | 7/2022 | Landis et al. |
| 2024/0357525 A1* | 10/2024 | Mu ......................... H04L 5/005 |
| 2025/0254636 A1* | 8/2025 | Cui ...................... H04W 24/10 |

FOREIGN PATENT DOCUMENTS

| | | | |
|---|---|---|---|
| EP | 3 471 469 | 4/2019 | |
| EP | 4131877 A1 * | 2/2023 | ........... H04L 5/0053 |
| WO | 2020/252684 | 12/2020 | |
| WO | 2023/000341 | 1/2023 | |

OTHER PUBLICATIONS

Technical specification (TS) 38.201—"5G; NR; Physical layer; General description", 3GPP TS 38.201 version 15.0.0 Release 15, Sep. 2018, 14 pages.

(Continued)

*Primary Examiner* — Peter P Chau
(74) *Attorney, Agent, or Firm* — Amin, Turocy & Watson, LLP

(57) ABSTRACT

A radio access network node transmits, according to a current format, a current synchronization signal block signal that comprises a format indication indicative of a format according to which the synchronization signal block signal was transmitted, or according to which a future synchronization signal block format will be transmitted. A user equipment decodes the format indication and looks up, in a format configuration codebook, a format corresponding to the format indication. The node may transmit a synchronization signal block signal with a format indication indicative of a change in synchronization signal block format if a format change criterion is satisfied, such as a number of user equipment attempting to connect to the node being less than a configured threshold.

20 Claims, 12 Drawing Sheets

(56)                 References Cited

OTHER PUBLICATIONS

Technical specification (TS) 38.331—"5G; NR; Radio Resource Control (RRC); Protocol specification", 3GPP TS 38.331 version 16.1.0 Release 16, Jul. 2020, 886 pages.

Technical specification (TS) 38.211—"5G; NR; Physical channels and modulation", 3GPP TS 38.211 version 16.2.0 Release 16, Jul. 2020, 136 pages.

Technical specification (TS) 38.304—"5G; NR; User Equipment (UE) procedures in idle mode and in RRC Inactive state", 3GPP TS 38.304 version 16.1.0 Release 16, Jul. 2020, 41 pages.

Technical specification (TS) 38.300—"5G; NR; NR and NG-RAN Overall description; Stage-2" 3GPP TS 38.300 version 16.4.0 Release 16, Jan. 2021, 151 pages.

Invitation to Pay Additional Fees mailed Feb. 26, 2024 for PCT Application No. PCT/US2023/035969, 20 pages.

International Search Report and Written Opinion mailed Jun. 17, 2024 for PCT Application No. PCT/US2023/035969, 30 pages.

Notification Concerning Transmittal of International Preliminary Report on Patentability mailed Sep. 11, 2025 for PCT Application No. PCT/US2023/035969, 30 pages.

European Office Action mailed Oct. 9, 2025 for European Patent Application No. 23809826.3, 3 pages.

\* cited by examiner

Exemplary configurable SSB formats with different contents and various device processing load for SSB decoding Format 305n Format 305B Format 305A Exemplary configurable SSB formats with payload geared to certain purposes

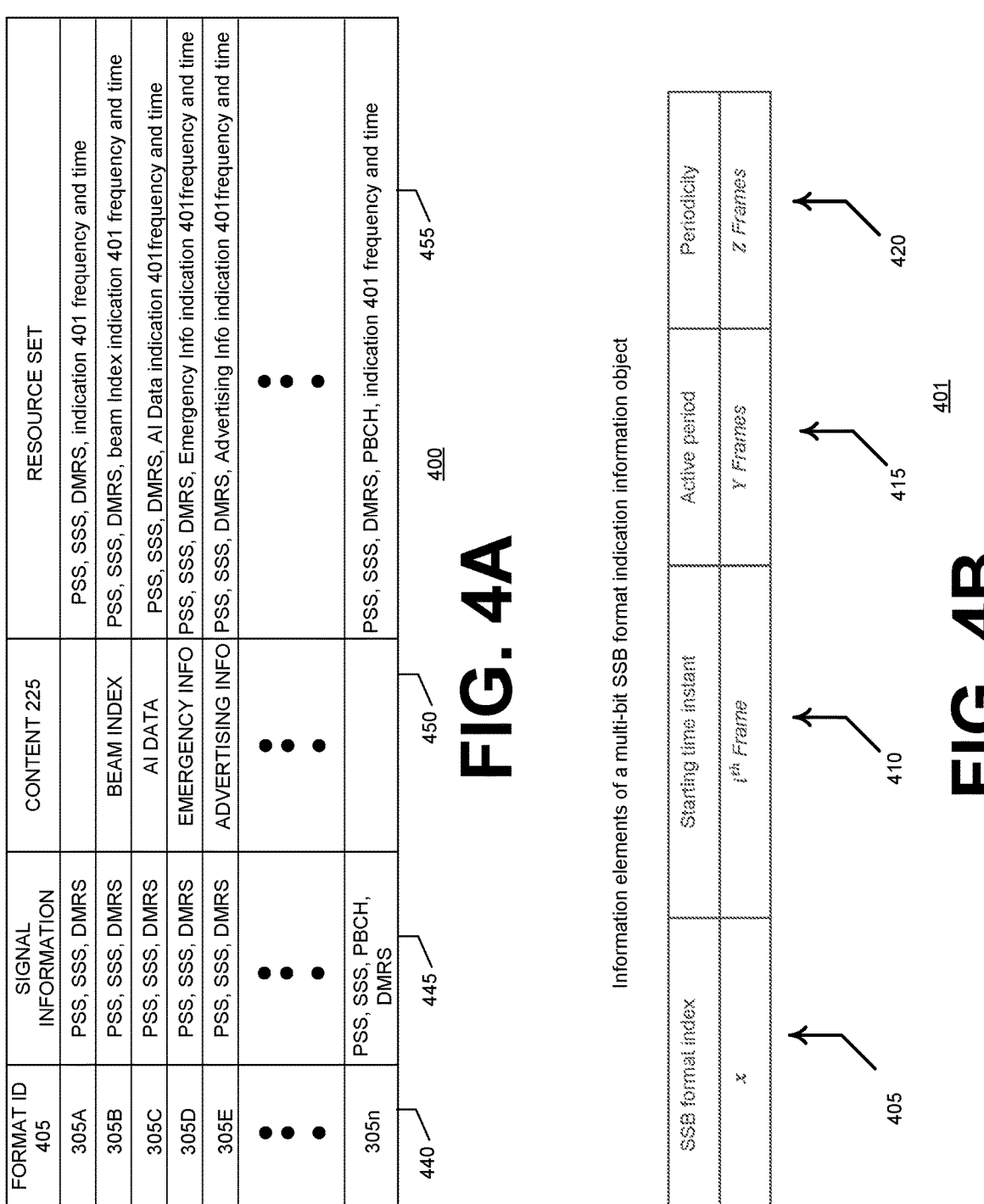

| FORMAT ID 405 | SIGNAL INFORMATION | CONTENT 225 | RESOURCE SET |
|---|---|---|---|
| 305A | PSS, SSS, DMRS | | PSS, SSS, DMRS, indication 401 frequency and time |
| 305B | PSS, SSS, DMRS | BEAM INDEX | PSS, SSS, DMRS, beam Index indication 401 frequency and time |
| 305C | PSS, SSS, DMRS | AI DATA | PSS, SSS, DMRS, AI Data indication 401 frequency and time |
| 305D | PSS, SSS, DMRS | EMERGENCY INFO | PSS, SSS, DMRS, Emergency Info indication 401 frequency and time |
| 305E | PSS, SSS, DMRS | ADVERTISING INFO | PSS, SSS, DMRS, Advertising Info indication 401 frequency and time |
| • • • | • • • | • • • | • • • |
| 305n | PSS, SSS, PBCH, DMRS | | PSS, SSS, DMRS, PBCH, indication 401 frequency and time |

Information elements of a multi-bit SSB format indication information object

| SSB format index | Starting time instant | Active period | Periodicity |
|---|---|---|---|
| x | $i^{th}$ Frame | Y Frames | Z Frames |

A method, comprising: transmitting, by a radio access network node comprising a processor, a first synchronization signal block signal, according to a first synchronization signal block format, comprising a first format indication indicative of a second synchronization signal block format
705

transmitting, by the radio access network node, a second synchronization signal block signal according to the second synchronization signal block format
710

wherein the first synchronization signal block signal comprises a non-access information indication indicative of at least synchronization information corresponding to the radio access network node
715

wherein the second synchronization signal block signal comprises the non-access information indication and an access information indication indicative of minimum system information
720 wherein access information is excluded from the first synchronization signal block signal, and wherein the minimum system information comprises master information block information
725

Figure 8:
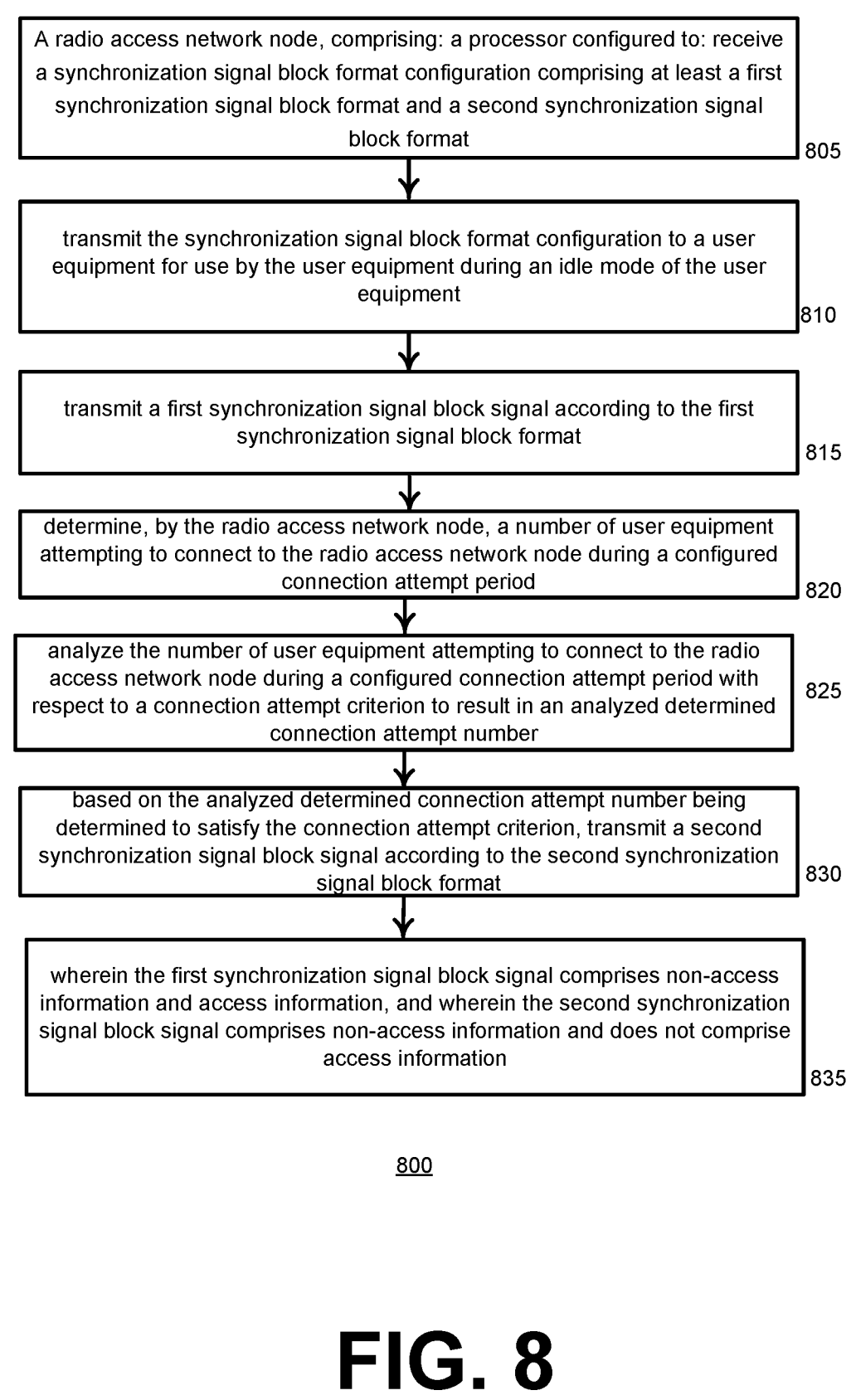

A radio access network node, comprising: a processor configured to: receive a synchronization signal block format configuration comprising at least a first synchronization signal block format and a second synchronization signal block format
805 transmit the synchronization signal block format configuration to a user equipment for use by the user equipment during an idle mode of the user equipment
810 transmit a first synchronization signal block signal according to the first synchronization signal block format
815 determine, by the radio access network node, a number of user equipment attempting to connect to the radio access network node during a configured connection attempt period
820 analyze the number of user equipment attempting to connect to the radio access network node during a configured connection attempt period with respect to a connection attempt criterion to result in an analyzed determined connection attempt number
825 based on the analyzed determined connection attempt number being determined to satisfy the connection attempt criterion, transmit a second synchronization signal block signal according to the second synchronization signal block format
830 wherein the first synchronization signal block signal comprises non-access information and access information, and wherein the second synchronization signal block signal comprises non-access information and does not comprise access information
835

Figure 9:
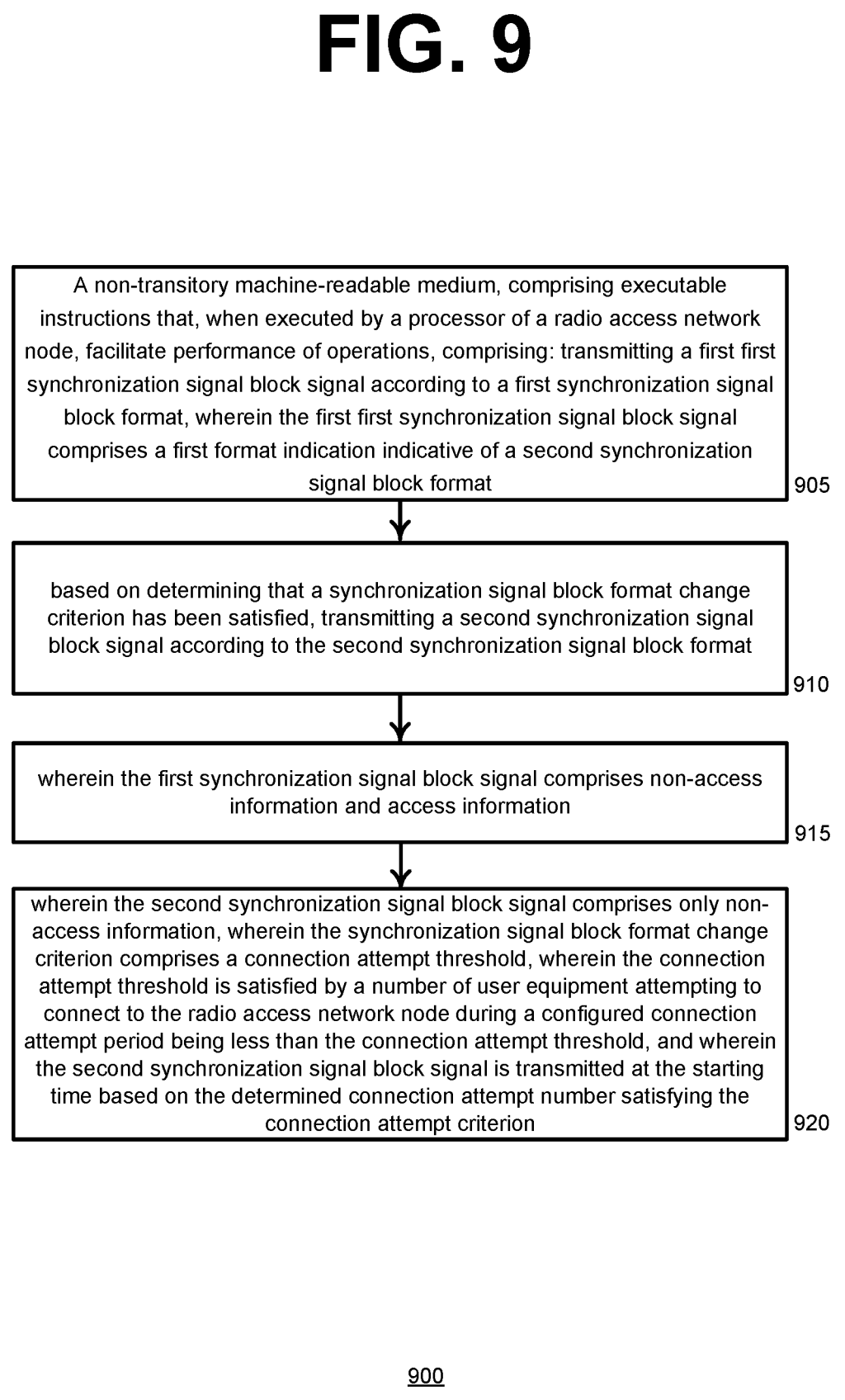

A non-transitory machine-readable medium, comprising executable instructions that, when executed by a processor of a radio access network node, facilitate performance of operations, comprising: transmitting a first first synchronization signal block signal according to a first synchronization signal block format, wherein the first first synchronization signal block signal comprises a first format indication indicative of a second synchronization signal block format 
905 based on determining that a synchronization signal block format change criterion has been satisfied, transmitting a second synchronization signal block signal according to the second synchronization signal block format 
910 wherein the first synchronization signal block signal comprises non-access information and access information 
915 wherein the second synchronization signal block signal comprises only non-access information, wherein the synchronization signal block format change criterion comprises a connection attempt threshold, wherein the connection attempt threshold is satisfied by a number of user equipment attempting to connect to the radio access network node during a configured connection attempt period being less than the connection attempt threshold, and wherein the second synchronization signal block signal is transmitted at the starting time based on the determined connection attempt number satisfying the connection attempt criterion 
920

900

DYNAMIC CONFIGURATION OF SYNCHRONIZATION SIGNAL

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise transmitting, by a radio access network node comprising a processor, a first synchronization signal block signal, according to a first synchronization signal block format, comprising a first format indication indicative of a second synchronization signal block format; and transmitting, by the radio access network node, a second synchronization signal block signal according to the second synchronization signal block format. In an embodiment, the first format indication may be indicative of the second synchronization signal block format being the same as the first synchronization signal block format. In another embodiment, the first format indication may be indicative of the second synchronization signal block format being the different than the first synchronization signal block format. The first format indication may be indicative of the second synchronization signal block format being the same as the first synchronization signal block format if a starting time, which may be indicated in the first format indication, of transmission of synchronization signal blocks signals by the radio access network node according to a change in format has not occurred yet. The first format indication may be indicative of the second synchronization signal block format being different than the first synchronization signal block format if a starting time for transmission of synchronization signal blocks signals by the radio access network node according to a change in format has occurred. In an embodiment, the format indication comprises a starting time indication indicative of the second format being the same as the first format. In other words, a starting time indication may indicate that the first SSB signal is being transmitted according to a first format that is the same format as the second format, which is indicated in the first format indication.

The first format indication may comprise at least one of: a format index corresponding to the second synchronization signal block format or a starting time indication indicative of an occasion of transmitting the second synchronization signal block signal according to the second synchronization signal block format. The first format indication may comprise at least one of an active period indication indicative of an active period during which the radio access network node is to transmit the second synchronization signal block signal according to the second synchronization signal block format, or a transmission periodicity indication indicative of a periodicity at which the radio access network node is to transmit the second synchronization signal block signal according to the second synchronization signal block format.

In an embodiment, the first synchronization signal block signal may comprise a non-access information indication indicative of at least synchronization information corresponding to the radio access network node. The synchronization information may comprise primary synchronization signal information. The primary synchronization signal information may temporally precede the first format indication in the first synchronization signal block signal. The second synchronization signal block signal may comprise the non-access information indication and an access information indication indicative of minimum system information. Access information may be excluded from the first synchronization signal block signal. The minimum system information may comprise master information block information.

The second synchronization signal block signal comprises a second format indication indicative of a third synchronization signal block format, and the method may further comprise transmitting, by the radio access network node, a third synchronization signal block signal according to the third synchronization signal block format. The first synchronization signal block format, the second synchronization signal block format, and the third synchronization signal block format may be different.

In an embodiment, the third synchronization signal block signal may comprise a content indication indicative of content data, other than non-access information or access information, contained in the third synchronization signal block signal. The content data may comprise advertisement information to be rendered via a user equipment. The content data may comprise emergency alert information to be rendered via a user equipment. The content data may comprise at least one of: calibration data to be used by a user equipment to calibrate a radio function of the user equipment, a beam indication corresponding to the transmitting of the third synchronization signal block signal, or timing information corresponding to the radio access network node. In another example embodiment, a radio access network node may comprise a processor configured to generate a synchronization signal block format configuration comprising at least a first synchronization signal block format and a second synchronization signal block format; and to transmit the synchronization signal block format configuration to a user equipment for use by the user equipment during an idle mode of the user equipment.

The processor may be further configured to transmit a first synchronization signal block signal according to the first synchronization signal block format and determine a number of user equipment attempting to connect to the radio access network node during a configured connection attempt period. The processor may be further configured to analyze the number of user equipment attempting to connect to the radio access network node during a configured connection attempt period with respect to a connection attempt criterion to result in an analyzed determined connection attempt number, and based on the analyzed determined connection attempt number being determined to satisfy the connection attempt criterion, transmit a second synchronization signal block signal according to the second synchronization signal block format.

The first synchronization signal block signal may comprise non-access information and access information, and the second synchronization signal block signal may comprise non-access information and does not comprise access information. The second synchronization signal block signal comprises a content indication indicative of content data in the second synchronization signal block signal.

In an embodiment, the processor radio access network node may be further configured to transmit a first first synchronization signal block signal according to the first synchronization signal block format (e.g., a first transmission of the first synchronization signal block signal according to the first synchronization signal block format). The processor may be further configured to determine a number of user equipment attempting to connect to the radio access network node during a configured connection attempt period resulting in a determined connection attempt number and to analyze the determined connection attempt number with respect to a connection attempt criterion to result in an analyzed determined connection attempt number. Based on the analyzed determined connection attempt number being determined to satisfy the connection attempt criterion, the processor may be configured to transmit a last first synchronization signal block signal according to the first synchronization signal block format, and to transmit a second synchronization signal block signal according to the second synchronization signal block format.

In yet another exemplary embodiment, a non-transitory machine-readable medium may comprise executable instructions that, when executed by a processor of a radio access network node, facilitate performance of operations, comprising transmitting a first first synchronization signal block signal according to a first synchronization signal block format, wherein the first first synchronization signal block signal comprises a first format indication indicative of a second synchronization signal block format. Based on determining that a synchronization signal block format change criterion has been satisfied, the operations may further comprise transmitting a second synchronization signal block signal according to the second synchronization signal block format, wherein the first synchronization signal block signal comprises non-access information and access information.

The first format indication may comprise a starting time indication indicative of a first transmitting of the second synchronization signal block signal according to the second synchronization signal block format, and the first format indication may comprise an active period indication indicative of an active period during which the radio access network node is to transmit the synchronization signal block signal according to the second synchronization signal block format. The operations may further comprise transmitting the second synchronization signal block signal at the starting time, and after expiration of the active period, transmitting a second first synchronization signal block signal according to the first synchronization signal block format.

In an embodiment, the second synchronization signal block signal may comprise only non-access information. The synchronization signal block format change criterion may comprise a connection attempt threshold. The connection attempt threshold may be satisfied by a number of user equipment attempting to connect to the radio access network node during a configured connection attempt period being less than the connection attempt threshold. The second synchronization signal block signal may be transmitted at the starting time based on the determined connection attempt number satisfying the connection attempt criterion.

BRIEF DESCRIPTION OF THE DRAWINGS

FIG. 4A illustrates an example codebook configuration of different SSB formats received by a user equipment from a radio access network node.

FIG. 4B illustrates an example adaptive synchronization signal block format indication template.

FIG. 7 illustrates a block diagram of an example method embodiment.

FIG. 8 illustrates a block diagram of an example radio access network node embodiment.

FIG. 9 illustrates a block diagram of an example non-transitory machine-readable medium embodiment.

DETAILED DESCRIPTION OF THE DRAWINGS

Figure 1:
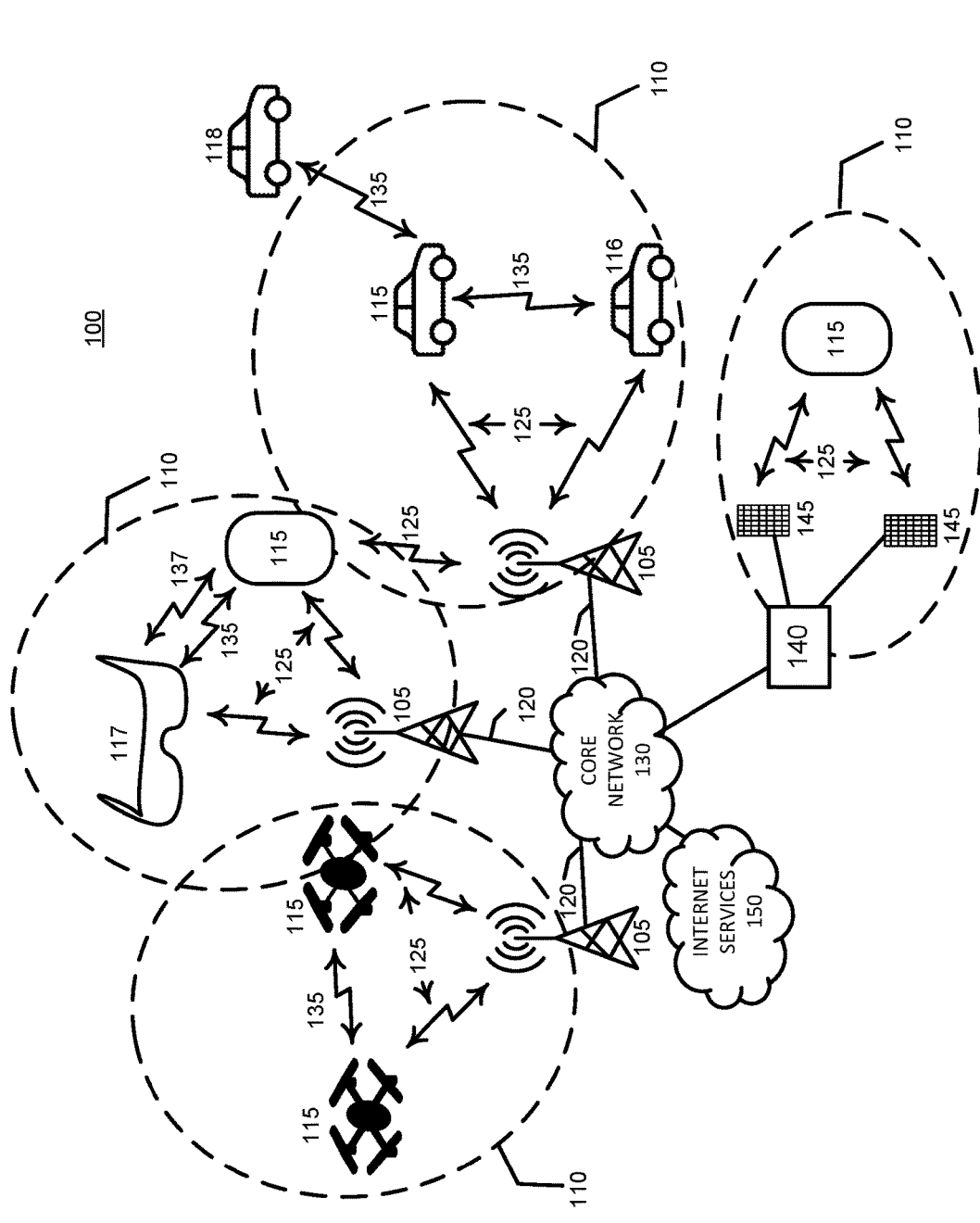
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $Ts=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Network Energy Saving.

Energy or power saving is desirable in cellular networks, for both network equipment and user equipment. An objective of Network Energy Saving ("NES") mode is to facilitate a RAN node, that may be experiencing high power consumption, limited battery capacity, or power source disruptions, dynamically relaxing support one or more radio functions, or one or more radio services, that the RAN node may otherwise support, until an improvement in power situation is achieved, for example, an off-site power source of the RAN node being restored such that the RAN no longer relies on power from a battery on-site at the RAN, or until capacity of an on-site battery is restored to a configured level. Implementing NES may facilitate cost efficiency or power efficiency at the RAN node, (e.g., activating NES mode during a light load time for a RAN that experiences a high variance rate of traffic loads throughout a given day), or may facilitate service continuity, especially for emergency services/calls, in case of power source disruptions/outage.

Accordingly, a cell's RAN node may dynamically implement NES mode to temporarily halt support of, or offering of, high-energy-consumption radio services for a determined or configured period. Non-limiting examples of power-heavy radio services, or operations, include ultra-fast scheduling associated with mini-slot scheduling for latency-critical services, data duplication for enhanced radio reliability, and others. For already-connected user equipment (e.g., a user equipment that is RRC CONNECTED with a RAN), the RAN may already be aware of services, traffic types, and quality of service (QOS) targets, corresponding to traffic flows associated with the already-connected user equipment. Thus, the RAN node can determine to avoid NES activation to avoid negatively impacting critical traffic currently being served to the user equipment by the RAN. However, the RAN node may not be aware of a user equipment in an IDLE mode that are not actively connected to the RAN node even if the idle mode user equipment are within a coverage area, or range, of the RAN and the RAN node may not be aware of target QoS targets or services that may be needed, or requested, by an idle user equipment when user equipment later initiates connection to the RAN node. Thus, according to current implementations, an idle mode user equipment device, which may be camped on a NES-mode-activated RAN node, may only be aware of the NES mode activation by the RAN and the services which are currently not offered or not supported by the RAN node, when the user equipment initiates connection establishment procedures with the RAN node. Such initiation of connection procedures may comprise user equipment devices executing random access procedures and corresponding subsequent power-heavy and signaling-heavy connection establishment procedures. Only after initiating and connecting to the RAN node may the user equipment become aware that the RAN node has activated NES mode and is not currently offering or supporting a service or radio function that the user equipment may need to request, which may result in the user equipment discarding the established connection with the RAN and attempting reselection of another neighboring RAN node. Such connecting of the user equipment to the RAN node may lead to energy inefficiency at both the RAN node and at the user equipment as well as wasted signaling overhead and a delayed network access of impacted idle devices.

Currently, several schemes for implementing network power savings may be implemented. An example of a currently implemented NES mode procedure is Aggregated Paging Occasions ("APO"), wherein user equipment devices are aggregated to monitor and blindly decode the same paging occasion. This reduces the total number of paging occasions a RAN node has to transmit but comes at the expense of idle mode devices waking up and decoding the same paging occasion that may include paging information for only a single user equipment device, (e.g., a paging 'false alarm'). With APO, benefits of NES may be overshadowed by increased energy consumption at aggregated user equipment devices due to paging false alarms.

Another example of a currently implemented NES mode procedure is for a cell/RAN node to shut down and not accept new connection requests from user equipment that are not currently connected to the cell/RAN. Shutting down the accepting of new connection requests, or even stopping current device connections for all or part of one or more active services, is a straightforward NES solution, but one that may cause a negative impact on a user equipment's achievable quality of service. Furthermore, shutting down accepting of new connection request may lead to coverage gaps, where an idle user equipment may be unaware of, or 'blind' to, the halting of services resulting in the user equipment attempt to connect to the RAN (and thus expending battery power and time resources of the user equipment) notwithstanding that the RAN is not currently offering a service that the user equipment needs to the RAN. In case of a need for an emergency service, such as fire, rescue, law enforcement, etc., a user equipment being blind to radio services that have been deactivated by a RAN may impose a safety risk to a user of the blind user equipment.

Idle mode operations comprise several procedures for user equipment devices in idle mode, for example: determining coverage level/signal strength corresponding to surrounding cells; camping on, or selecting, a certain cell/RAN; or monitoring a detected coverage level/signal strength of the cell/RAN in case the user equipment moves or radio conditions change. Idle mode devices may be viewed as active user equipment that are not connected to a cell/RAN, thus the RAN network is not aware of locations of idle mode devices and a density of idle user equipment.

When a user equipment device is turned on, the user equipment device searches for and attempts decoding synchronization signal blocks ("SSB") signals of surrounding cells—SSB signals are typically the sole always-transmitted signals of a 5G RAN node. SSB signaling may facilitate idle mode user equipment devices to, for example: obtain downlink radio frequency ("RF") receiver synchronization with the surrounding cells/RANs; determine cell identifiers of the surrounding cells/RANs; and determine coverage levels using SSB downlink reference signal (e.g., the user equipment may determine signal strength based on reference signal received power ("RSRP") corresponding to each of the detected cells/RANs).

Accordingly, an idle mode device, based on detected SSB signals, and based on determined coverage levels of surrounding cells/RANs corresponding to the determined cell/

RAN identifiers, selects a stand-by cell/RAN to camp on that offers the best coverage level/determined signal strength. The user equipment initiates a connection to the stand-by cell/RAN (e.g., initiates an RRC connection) when the user equipment needs to connect to the network, (e.g., for receiving a call or for initiating an uplink data session without using time to perform cell selection, since the cell/RAN selection has already been performed). Thus, cell/RAN selection procedures are typically periodically executed regardless of whether the idle mode device needs to connect to the cell/RAN.

An idle mode user equipment device may initiate cell re-selection using the same procedure as cell selection but searching for another cell than the one previously selected/currently-selected at an instant according to an idle mode period configured at the user equipment or periodically according to a configuration received from the cell/RAN. Cell/RAN re-selection benefits a user equipment because a given selected cell/RAN that was optimum with respect to the user equipment at one time may not provide a determined strongest signal strength at a later time, which scenario may occur if the idle mode user equipment is moving between cells or if channel radio conditions change. Thus, when a coverage degradation of a currently selected cell is detected (based on a defined set of conditions being satisfied), an idle mode device may initiate idle-mode reselection. A cell/RAN node is typically not aware of a reselection determination made by an idle mode device.

For a given selected cell, an idle mode device monitors SSB information transmitted from the cell/RAN and monitors the determined paging occasion(s) corresponding to the cell/RAN. Monitoring SSB information facilitates an idle mode device staying up-to-date regarding coverage levels of the selected cell/RAN and triggering cell-reselection if needed to support an incoming call or data traffic transmission.

Thus, although cells/RANs transmitting SSB signals facilitate user equipment transition from a low-power IDLE mode to a higher power CONNECTED mode, transmission of SSB signals is an energy-heavy operation at a cell/RAN. When an idle mode user equipment connects to a RAN node (e.g., transitions from idle to connected mode), the user equipment 'assumes' that services, or QoS profiles that it is pursuing, or requesting, are offered by the currently selected cell. If an idle mode user equipment transitions to a connected mode and then determines that a service that the user equipment needs is inactive at the RAN it is connected to, the UE has expended battery power and time resources in establishing the fruitless connection.

An SSB signal is a 5G signal that is typically always on, or always transmitted via the 5G radio interface, regardless of user equipment capability or battery condition. A user equipment may use an SSB signal and information contained therein to identify the existence of the cell/RAN that transmits the SSB signal, received coverage level from the cell/RAN (e.g., the coverage bar on a mobile handset screen), as well as additional cell information used for cell connection establishment and access by the user equipment. To reduce power consumption at a cell/RAN, for example when a RAN may be operating on a battery or just to reduce costs paid to an electric utility company for offsite power supplied to the RAN, relaxation of regular SSB signal transmission may be desirable. However, without continuous, regular transmission of an SSB signal, user equipment in an idle mode that are within a range such that the user equipment has an adequate coverage level to facilitate communication with the RAN may not identify a cell/RAN and may treat lack of a SSB signal with an adequately strong signal strength as a coverage gap, even if the user equipment is actually within a range of a RAN having a strong coverage at the user equipment such that adequate communication could be facilitated. Without being able to receive an SSB signal from a cell/RAN, network communication service to an idle user equipment cannot typically be established due to lack of SSB transmission from the cell/RAN, which may be power-limited due to operating on battery power, for example. Accordingly, user equipment may attempt searching for service from another cell/RAN instead. Thus, relaxation of SSB signal transmission may come at the expense of degraded network access performance, especially in the case where coverage of an available adjacent cell (e.g., available because the adjacent RAN is transmitting SSB signaling messages) is much poorer than the coverage level of the RAN that has 'relaxed', or suspended, transmission of SSB signaling messages.

Synchronization Signal Block (SSB) Signals.

SSB signals may facilitate cell identification and camping. During a period of idle mode, a user equipment typically periodically wakes up and attempts decoding of SSB signals transmitted by surrounding cells/RAN nodes. An SSB signal may comprise a set of signals, or a set of information, transmitted by a RAN to facilitate idle mode user equipment in becoming aware of radio information corresponding to RAN that transmitted the SSB signal. Information transmitted in an SSB signal may comprise, for example: a RAN/cell identifier; RAN/cell-specific reference signals for detecting a coverage level/signal strength corresponding to the RAN/cell at the user equipment; bandwidth information corresponding to capabilities of the RAN/cell, antenna setup, or radio timing information of the transmitting cell. An SSB signal may comprise a block of signals that may comprise: a primary synchronization signal ("PSS"); a secondary synchronization signal ("SSS"); or demodulation reference signals ("DMRS"). In addition, an SSB signal may comprise a physical broadcast channel ("PBCH"), which may comprise: bandwidth setup information; antenna setup information; control search space information of the first system information block (SIB1); or system frame number ("SFN") timing information.

Idle mode user equipment devices may use received PSS and SSS information elements, either separately or in various combinations, to determine a transmitting RAN/cell identifier. Also, based on received DMRS, an idle mode user equipment may become able to determine a received coverage level corresponding to the transmitting cell and related channel conditions between the RAN and user equipment. A user equipment can decode the PBCH and extract broadcast information therefrom. However, conventional periodic, 'always-on', transmission of SSB signals is a power-heavy operation.

SSB transmission is the sole, always-on transmission of the 5G radio interface, where each SSB signal transmission results from a RAN/cell periodically compiling and transmitting multiple information elements including reference signals, primary and secondary synchronization signals, broadcast information in terms of a beam index over which the SSB signal is transmitted, system frame number timing information, bandwidth setup, control channel search space information, and antenna configurations. Each of these information elements may be used by an idle mode user equipment for multiple purposes, including facilitating a user equipment accessing (e.g., connecting to) the RAN node/cell, as well as a user equipment merely measuring a received coverage level/signal strength corresponding to an SSB-transmitting RAN/cell—an idle mode user equipment may use such measurement to select, or reselect, a RAN/cell to be used for future radio network connection . . . . Accordingly, conventional periodic SSB signal transmission may be an energy inefficient operation from the perspective of a RAN/cell, including when there are few, if any, idle mode user equipment devices in a coverage area of an SSB-signal-transmitting RAN/cell.

In an embodiment, to reduce energy use at a RAN that always transmits SSB signals that comprise measurement only information (e.g., non-access information) and access information (e.g., MIB, SIB1, or other minimum system information), as well as to reduce energy use at a user equipment in decoding SSB signals that include access information, which may comprise more bits (e.g., an order of magnitude or more) than non-access information), according to some embodiments disclosed herein a RAN may exclude some SSB information elements according to a RAN-selectable SSB signal format design to reduce utilization of processing and power resources that may not be needed (e.g., if a user equipment is not attempting to access/connect to a RAN, the user equipment may not need to decode and process access information). For example, within a RAN/cell coverage range where many idle mode UE devices remain idle for extended periods of time without actually attempting to access the RAN/cell, an always-on transmission of full SSB content (e.g., a 'fully loaded' SSB signal) may not be necessary. In such a scenario with lack of demand by user equipment devices for connection establishment with a RAN, SSB access information can be transmitted less frequently while still transmitting SSB measurement-only information, thus saving RAN network energy usage. In contrast, current SSB signal adaptation may relax periodicity of transmitting fully loaded SSB signals, which can have a negative impact on idle mode connection performance due to absence of SSB reference signals used for measurement or selection purposes for longer periods, but only contemplates fixed SSB format and content (e.g., fixed signal loading).

Accordingly, embodiments disclosed herein facilitate dynamically adapting information and content of SSB signals based on current network energy conditions (e.g., a RAN may be operating on battery power or is attempting to reduce electricity costs) or idle mode device behavior (e.g., number of UE devices attempting to connect to a RAN during a configured period).

Network Configurable Synchronization Signal Format Design.

Using embodiments disclosed herein, content-adaptive SSB signal formats can dynamically tune transmission of SSB signals transmission, and included information elements (e.g., SSB signal loading), based on network energy consumption conditions and idle mode device behaviors. Multiple SSB signal load patterns/formats/designs may be predefined, where an indication of a format corresponding to a design of information and signaling can be included in a transmitted SSB signal. For example, an SSB format may be used to generate and transmit a measurement-only SSB signal having only reference signals and cell identification information. Another example format may comprise an SSB signal having network access information in addition to measurement-only information. Accordingly, a RAN/cell may dynamically transmit an SSB signal according to an indicated format toward idle mode user equipment devices. Indication of a changed SSB signal format, or changed SSB signal design, may be made via an SSB signal transmitted according to a current format that is different from a format, corresponding to a format indicated in a current SSB signal, to be used for a future SSB signal transmission. An indication of a future SSB signal format may comprise an indication of the future format's active period and transmission periodicity. Such indication may facilitate an idle mode user equipment device in becoming aware of what is expected to be received, thus avoiding power-heavy and processing-heavy blind decoding and may facilitate energy saving at a user equipment. For example, when a user equipment device attempts to access/connect to a RAN/cell, a dynamic SSB format indication embodiment as disclosed herein may facilitate a user equipment becoming aware in advance of which SSB signal transmission instant to decode or a time over which access information may be transmitted by the RAN/cell. Thus, if a user equipment device has already selected a RAN/cell for future access, the user equipment can skip monitoring and decoding signals transmitted by the selected RAN at SSB instants until an SSB signal transmission that comprises access information is transmitted. From the perspective of a RAN/cell, when a number of user equipment attempting to connect to the RAN/cell (e.g., user equipment devices transitioning from idle to connected mode) becomes low (e.g., falls below a threshold) the RAN/cell can dynamically switch to a 'light' or 'skinny' SSB pattern that does not comprise access information but that nevertheless facilitates idle mode user equipment devices being able to identify the RAN/cell and to determine corresponding coverage/signal strength, and less frequently schedule transmission of fully loaded SSB signals to facilitate devices connecting to the RAN/cell, thus offering an energy saving gain at a RAN node/cell by not always transmitting a fully loaded SSB signal and by sometimes transmitting a skinny SSB signal instead.

Energy conservation may be realized at a user equipment too. An idle mode user equipment device attempting to access, and connect to, a RAN node typically needs to decode an entire set of SSB content, including control channel search space information, antenna information, and timing information. However, an idle mode user equipment that only needs to measure a received coverage level for purposes of cell selection or reselection (without intending to actually access the network), may only need to decode reference signals transmitted by a RAN reference signals that are typically only a part of a fully loaded SSB signal.

Accordingly, using embodiments disclosed herein, a RAN node can dynamically switch SSB signal formats, and thus adapt a signal loading of a transmitted SSB signal based on, for example, a number of idle mode user equipment devices attempting to access the RAN node without disrupting idle mode operation. In embodiments, a RAN node can alternate SSB signal formats between multiple SSB patterns of various corresponding signal loads and power consumption levels and user equipment devices may become able to compare received coverage corresponding to the RAN with detected received coverage levels corresponding to adjacent RANs/cells. Thus, if user equipment devices are not accessing the RAN node, or if few are accessing the RAN node, the RAN node may determine that transmission of SSB signals according to a measurement-only format or other power-efficient SSB format is sufficient. If user equipment devices attempt to access the RAN node, they will be still able to determine the received coverage level of the RAN and adjacent RANs, and begin network access procedures towards a selected RAN (e.g., a RAN that the user equipment is camping on) when the RAN switches to transmitting SSB signals according to a full-load SSB pattern that include access information. As a tradeoff for decreased power consumption at the RAN or UE due to transmitting a skinny SSB signal, an increased delay in network access may occur since the UE may have to stay idle longer before the RAN transmits a fully-loaded SSB signal that includes information that can facilitate the UE in establishing connection with the RAN.

Figure 2:
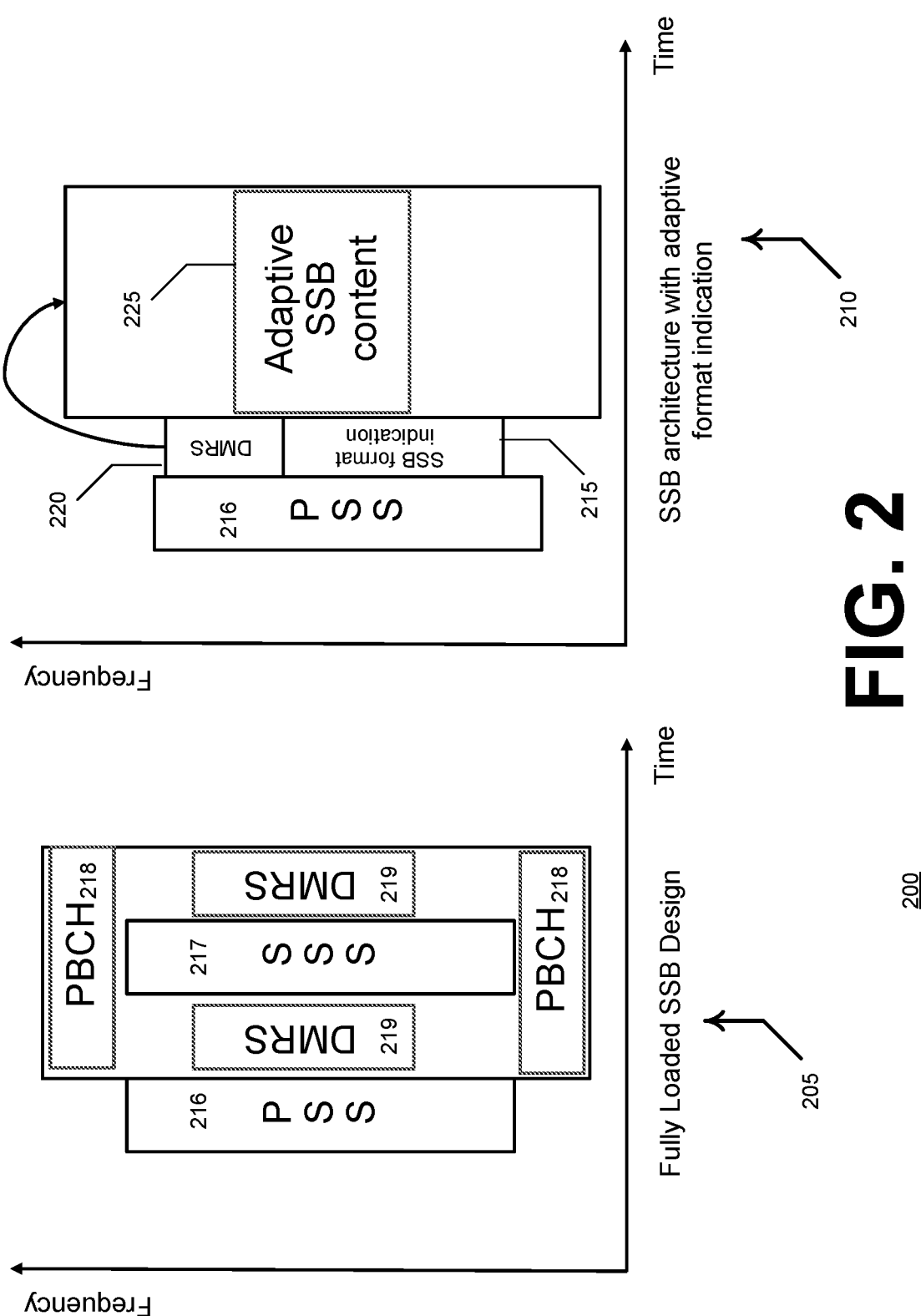
FIG. 2 illustrates an example synchronization signal block format.

As shown in FIG. 2, an example SSB signal loading embodiment 210 having a reduced, light, or 'skinny', signal loading is shown contrasted with a conventional, fully-loaded SSB signal format 205. Lightly loaded format 210 is shown comprising non-access PSS information 216. Embodiments disclosed herein may use information corresponding to format 205 for a scheduled SSB transmission to facilitate user equipment accessing a RAN. However, when network conditions comprise few, if any, user equipment devices attempting to access a RAN, for example, a format indication indicative of an SSB signal format may be embedded as part of a transmitted SSB signal, which transmitted signal could be an SSB signal comprising PSS information 216, SSS information 217, and PBCH information 218 shown in fully loaded SSB signal format 205. Therefore, a RAN/cell may be able to dynamically, 'on the fly', change format and signal loading of SSB signals. A shown in FIG. 3A, example skinny format 210 format indication 215 is shown in a certain frequency and time resource set. DMRS reference signals 220 may be placed and scrambled within frequency and time SSB resource sets that may be carrying SSB format indication 215 such that user equipment devices can efficiently and reliably decode the SSB format indication. Information contained in DMRS reference signals 220 may be used to decode adaptive SSB content 225, which may comprise non-access information.

Figure 3A:
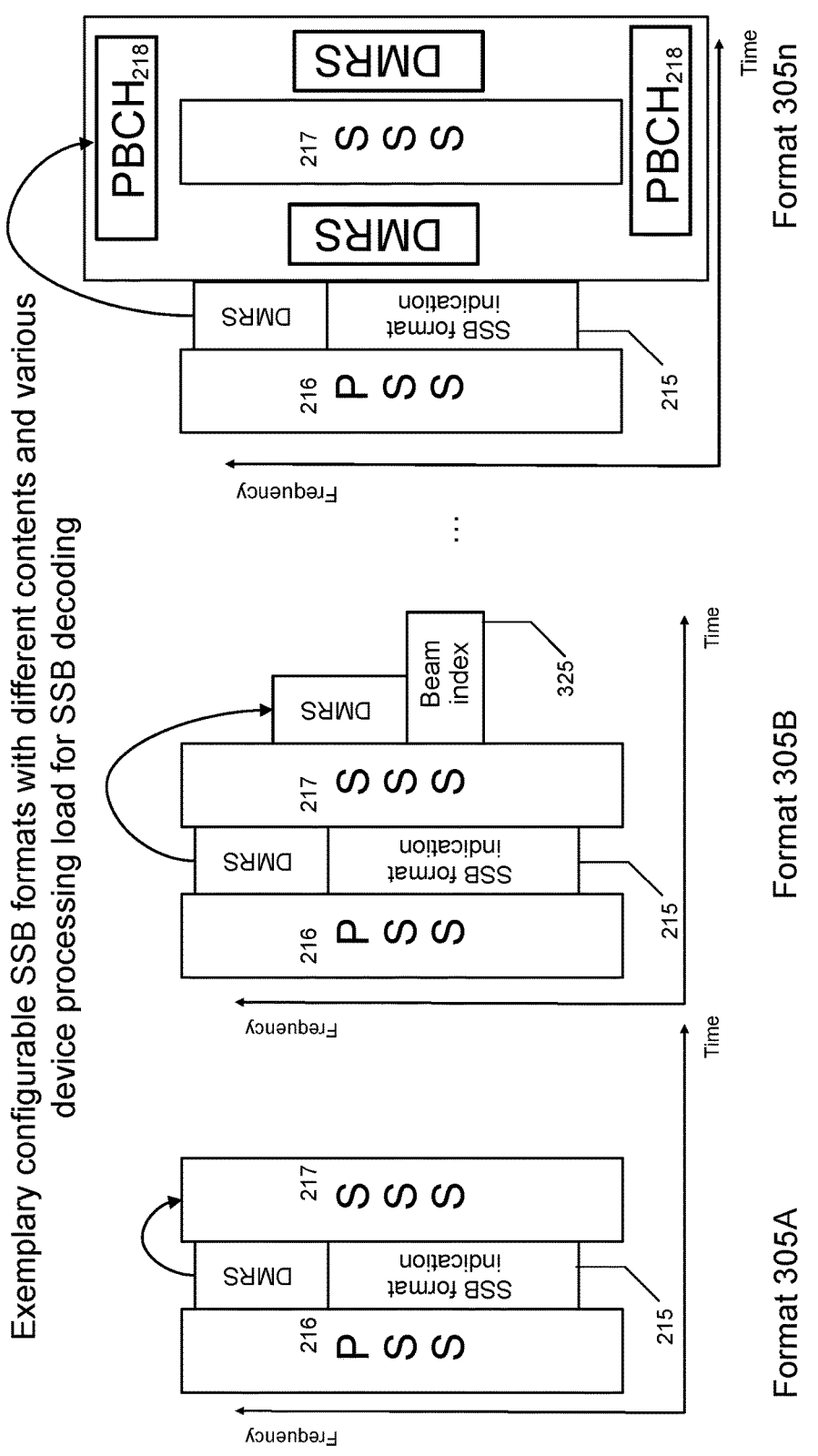
FIG. 3A illustrates example synchronization signal block formats that may be selected based on network conditions and user equipment idle mode behavior.

Thus, as depicted by FIG. 3A, multiple SSB patterns can be predefined and communicated to devices, through either a configuration or through high level idle mode signaling. An SSB format, pattern, or design may specify certain SSB information content loading corresponding to the format that may be selected by a RAN to facilitate certain transmission and reception processing effort and corresponding power consumption levels at both the RAN and at a user equipment. For instance, an indication 215 in an SSB signal that is indicative of SSB format 305A may indicate that a future SSB signal may be a 'lightly loaded' SSB with non-access information, such as PSS information 216 and SSS signal information 217. A signal generated and transmitted according to a lightly loaded format may not comprise access information. A user equipment receiving an SSB signal, transmitted according to format 305A for example, from which access information has been excluded may only be able to identify presence of, or that the user equipment is within coverage of, a RAN and an identifier of the RAN. The user equipment may still be able to determine that the user equipment is in the presence of the RAN, determine an identifier corresponding to the RAN, and determine a coverage/signal strength corresponding to the RAN even though an SSB signal that the user equipment decoded from the RAN does not comprise full SSB information (e.g., a SSB signal does not contain minimum system information, such as MIB information of information corresponding to SIB1 information, that a user equipment may need to connect to the RAN).

Different SSB signal formats may serve user equipment devices for different purposes. For example, as depicted FIG. 3A, SSB format 305A may be a format design for a measurement-only SSB and may only comprise non-access information such as SSS and PSS information, and reference signals for idle mode user equipment devices to measure received coverage level/signal strength corresponding to a RAN/cell and determine an identifier corresponding to the RAN/cell. Such a measurement-only format such as format 305A may be helpful to a user equipment device that is not 'intending', or attempting, to access a RAN/cell (e.g., the UE device is inactive or not being used by a user), but that may be nevertheless be periodically measuring received coverage levels from reachable RANs/cells for idle mode operation such as dynamic cell selection and re-selection. However, SSB format 305n, which may comprise an SSB signal format corresponding to fully loaded SSB signal, may comprise an SSB signal design to be used by a RAN/cell to transmit access information, such as PBCH information 218, as well as non-access information. Intermediate SSB formats, such as format 305B, may be used to serve other idle mode purposes. For example, an intermediate SSB format may include small-sized data (e.g., one or two bits) pushed and broadcast to user equipment in proximity of a RAN/cell transmitting an SSB signal, for purposes of delivering information pertaining to marketing, advertising, or an emergency (critical push notifications). Furthermore, an intermediate adaptive format can also incorporate idle mode (non-access) information that is tailored to a user equipment's idle mode operations. For example, information that is useful for calibrating and refining advanced device receivers, operations of which are facilitated by artificial intelligence ("AI"), may be delivered to a user equipment via an SSB format that may include information, such as, for example, a beam indication 225 or system timing information, without having to transmit full SSB information.

Responsive to determining that a condition satisfying a criterion has occurred, or exists, a RAN/cell may change a selection of SSB signal format and transmit an SSB signal with a format indication indicating a next SSB format that the RAN/cell will use to transmit SSB signals. For, example, on condition of a low number of user equipment accessing the RAN/cell during rolling period (e.g., not many UE devices are actually transitioning from idle to connected mode within cell coverage during a configured period), the RAN node/cell may transmit a measurement-only SSB signal that may facilitate an idle-mode user equipment performing signal strength measurements and cell selection/reselection based thereon, but the measurement-only SSB signal may not facilitate a user equipment in accessing and connection to the RAN/cell.

In another example, if a determination is made by a RAN that emergency broadcast information is available for transmission to user equipment, the RAN node/cell may select an SSB format that comprises a content data indication that may be small-sized (e.g., one, or two, or a few) as part of the SSB. Such a content data indication may be used by a user equipment to look up in a configured code book an emergency message to display based on the content data indication contained in an SSB signal. Thus, data may be conveyed from a RAN to a user equipment without the user equipment having to monitor, decode a fully-loaded SSB signal, or connect to the RAN, to receive data. Compared to existing push notification procedures, where devices must first fully decode a fully-loaded SSB content and decode multiple system information blocks before reading an emergency notification contained in a SIB, such as a SIB6, a SIB7, or a SIB8 an SUB2, using a content data indication, such as indication 330 of format 305D show in in FIG. 3B, a RAN may schedule a small-data notification directly as part of an SSB signal, thus reducing decoding latency and increasing decoding probability of such critical push data notifications by avoiding the requirement on devices to blindly decode multiple messages first before getting the emergency data.

In yet another example, a RAN node may determine, for example based on statistical analysis of user equipment connection activity, that more UE devices than a configured AI-capable-UE criterion that are in a coverage area of the RAN may support, or comprise, a receiver assisted by artificial intelligence ("AI") methods. The RAN may determine UE devices within coverage of the RAN based on beam indexes corresponding to the RAN received during previous connection attempts by UE devices that are known (by the RAN) to implement AI capability. The RAN may select and transmit an SSB signal according to SSB format 305C, shown in FIG. 3B, that includes an indication 325 of updated parameter information to be used by one or more AI algorithms at the user equipment. Thus, the RAN node can facilitate tuning and refining of radio functions of user equipment that use AI algorithms despite the user equipment not being connected to the RAN node.

Figure 3B:
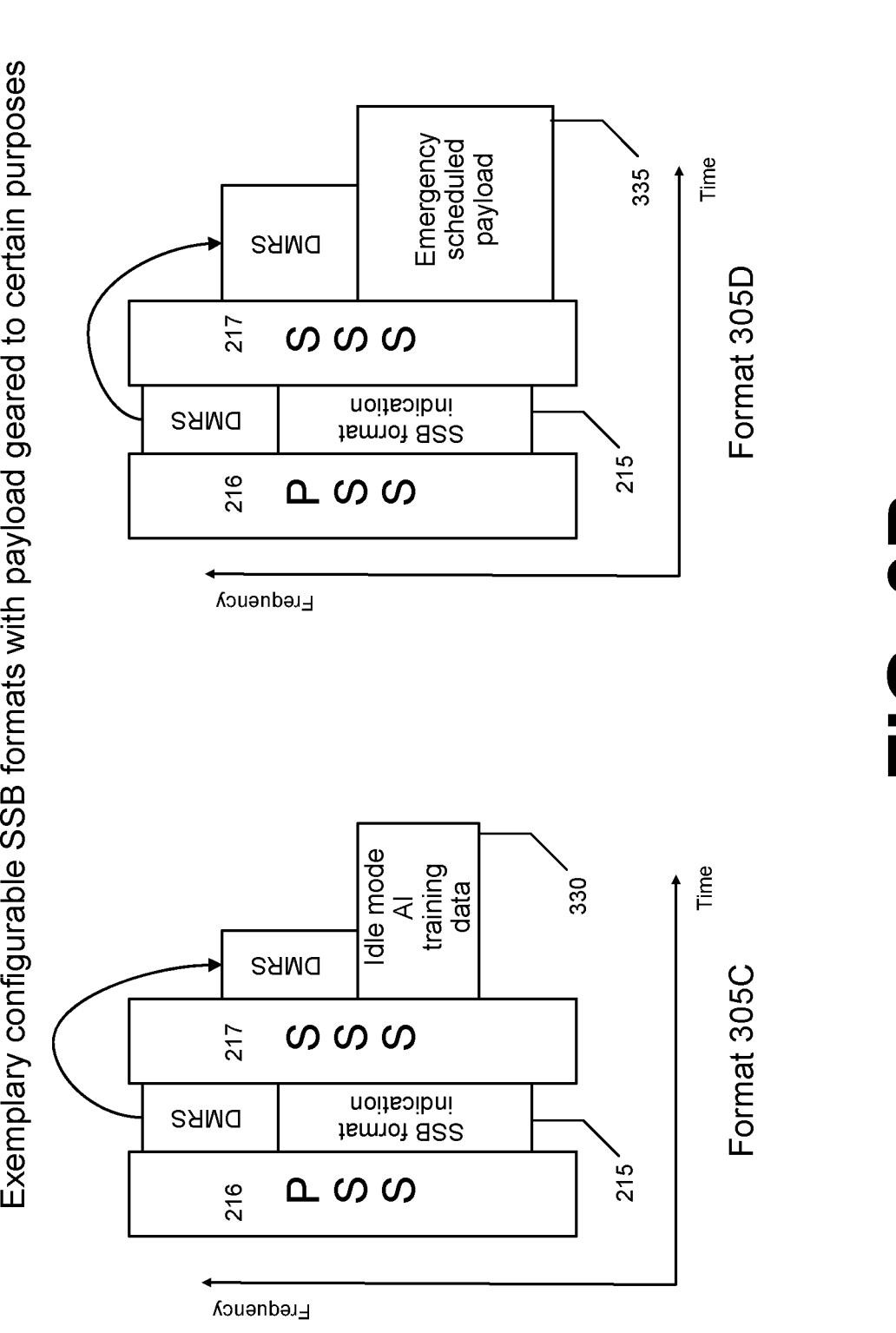
FIG. 3B illustrates example synchronization signal block formats that comprise content data that may be used for purposes other than radio network access or measurement.

FIG. 3B illustrates example synchronization signal block formats that comprise content data that may be used for purposes other than radio network access or measurement. Instead of comprising a beam index indication 325, as shown being part of format 305B, as shown in FIG. 3B, format 305C comprise idle-mode training data 330 that may be used to refine an AI model at a user equipment that facilitates, for example, a radio function of the user equipment. Format 305D may comprise emergency information indication 335 that may be used to look up in a codebook in a user equipment that has received an SSB signal that was transmitted according to format 305D an emergency message or instruction to be displayed or emitted by the user equipment. Training data 330 or emergency information 335 may be represented by fewer bits than may be used to indicate similar information to a user equipment via an SIB message signal, for example, which would require a user equipment actually connecting to a RAN and then processing information that may be represented by more bits than training data 330 indication or emergency information message indication 335.

To facilitate dynamic switching, or changing, of formats of transmitted SSB signals, a RAN may notify user equipment devices, via an SSB format indication 215, of what format to expect to receive from the RAN so that the user equipment avoids undertaking processor-intensive, power-consuming blind decoding. Accordingly, as shown by FIG. 4B, a dynamic SSB format indication 215 may be transmitted by a RAN according to indication format 401 to a user equipment as part of an SSB signal. An indication 215 may comprise a format index indication 405 that may be used by a receiving user equipment to look up, in a codebook, table, list, or other form of data structure stored in a memory of the user equipment, a format design corresponding to the format index that a format indication received in an SSB signal may comprise. An SSB format index 405 may comprise an index value indicative to an idle mode user equipment of an SSB signal format, or SSB signal format design, of an SSB signal transmitted by, or to be transmitted by, a RAN.

As shown in FIG. 4A, a user equipment may receive a configuration 400 from the RAN that comprises a list, or codebook, of SSB formats, and may use an SSB format design index indication 405 in a format indication 215 of a received SSB signal to lookup, in the configuration/codebook 400, an SSB signal format to be used to generate a future SSB signal transmitted by the RAN. Format indication 215 may comprise a starting time indication 410 indicative of a starting time of an SSB signal that is transmitted according to a format corresponding to format design index 405. SSB format indication 215 may comprise a starting time indication 410 indicative of a starting frame number, or an absolute time, when a RAN may begin transmitting an SSB signal according to an SSB format corresponding to index 405. Format indication 215 may comprise an SSB format active period indication 415 indicative of an active period that a RAN may transmit an SSB signal according to a format indicated by index indication 405 after beginning such transmission at a time indicated by starting time indication 410. Format indication 215 may comprise an SSB format periodicity indication 420 indicative of a transmission periodicity of an SSB signal that is transmitted according to a format indicated by index indication 405 during an SSB format active period corresponding to active time indication 415.

Dynamic SSB format indication 215 may facilitate idle mode devices skipping one or more SSB reception occasions based on the format indication indicating that an SSB signal will not include network access related information. When an idle mode user equipment device has selected a cell, for example, by monitoring non-access information such as PSS or SSS information in an SSB signal and has determined, based on a signal strength corresponding to the SSB signal, to select, for future connection, the RAN that transmitted the SSB signal, the user equipment can skip decoding, at configured SSB instants, SSB signals transmitted from the selected RAN that, according to an SSB format indication, will not include network access information (e.g., according to an SSB format indication, a UE can skip monitoring and decoding of measurement-only, or 'lightly loaded', synchronization signal block signals). A dynamic SSB format indication 215 included in an SSB signal may facilitate an idle mode user equipment device becoming aware of when a 'fully loaded' SSB signal (e.g., an SSB signal comprising access-information such as MIB or SIB 1 information) may be transmitted from a RAN again.

Configuration 400 may comprise a format identifier field 440 that contains one or more identifiers 405 that may be transmitted in an SSB signal from a RAN node. The one or more format identifiers 405 may correspond to one or more different formats 305A through 305n as described in reference to FIG. 3A and FIG. 3B. Configuration 400 may comprise a signal information field 445 that indicates to a user equipment which signals, or signal information, may be included in and SSB signal transmitted according to a format corresponding 305A-305n. Configuration 400 may comprise a content field 450 that may indicate to a user equipment a type of non-access information 225 (described in reference to FIG. 3A) that an SSB signal may comprise. Configuration 400 may comprise a resource set field 455 that indicates to a user equipment frequency and timing information to be used to monitor and decode signal information indicated in field 445 and content information indicated in field 450.

Figure 5:
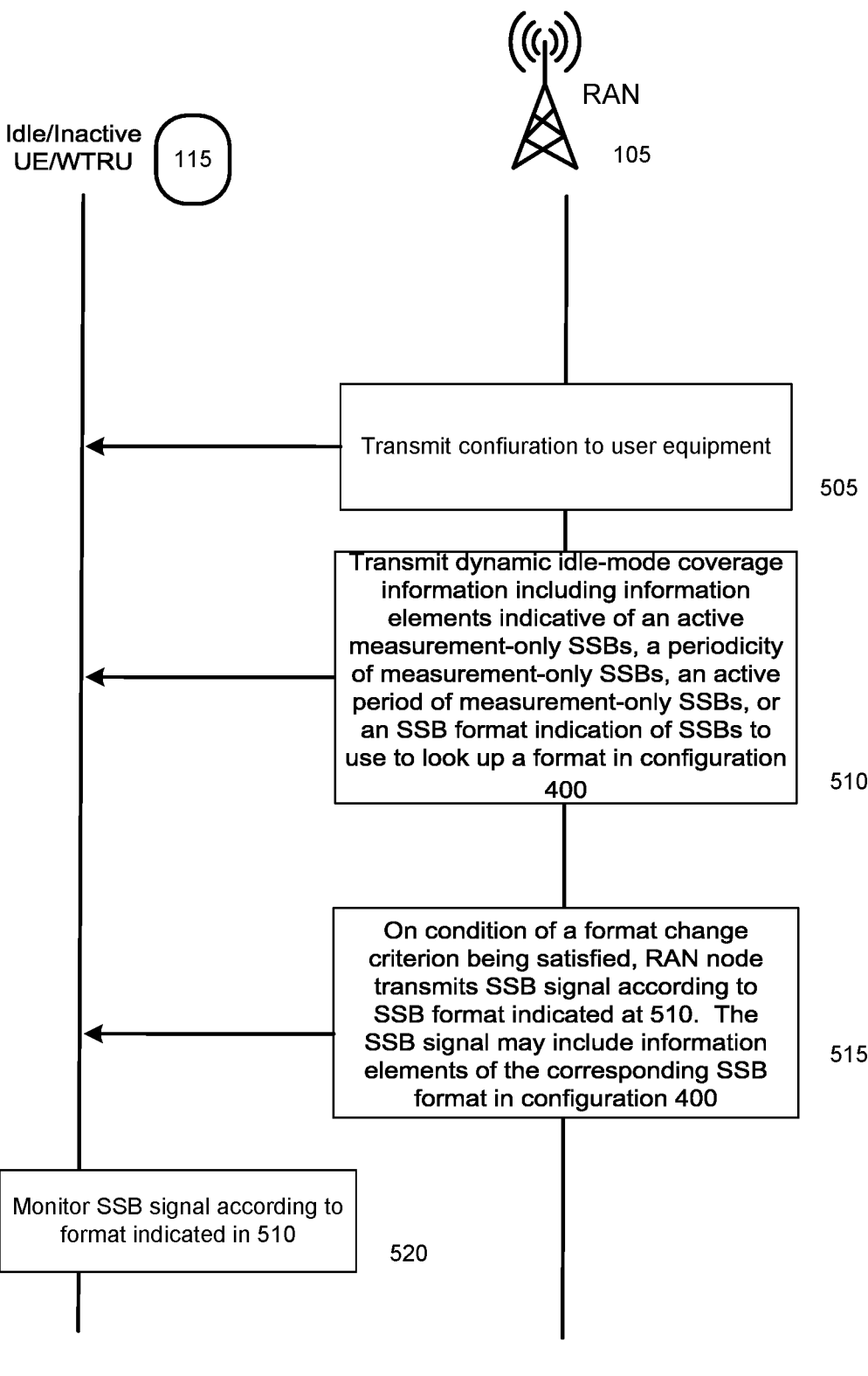
FIG. 5 illustrates a timing diagram of an example embodiment method of a radio access network configuring a user equipment with an adaptive synchronization signal block monitoring configuration.

Turning now to FIG. 5, the figure illustrates a timing diagram of an example embodiment method 600 of RAN node 105 transmitting to user equipment 115 an adaptive synchronization signal block monitoring indication, such as indication 215 described in reference to FIG. 2, FIG. 3A, or FIG. 3B. At act 505 shown in FIG. 5, RAN 105 transmits to user equipment 115 a configuration, for example configuration 400 described in reference to FIG. 4A. At act 510, RAN 105 may transmit, and UE 115 may receive, in an SSB signal, a format indication 215 indicative of a SSB signal format according to which a future SSB signal will be transmitted by the RAN. In an embodiment, indication 215 in the SSB signal transmitted at act 510 may comprise an indication of a format according to which the RAN transmitted the current SSB signal. Format indication 215 may indicate idle-mode coverage information to be used by UE during idle-mode to make measurement RAN coverage/signal strength measurements, periodicity of a measurement-only SSB, and active period of a measurement-only SSBs. Format indication 215 may comprise an indication of an SSB format for UE 115 to retrieve from a list of available SSB formats, (e.g., from configuration 400) where each SSB format maps to certain information embedded in the corresponding SSB. For example, SSB format 305A may map to: SSS or PSS information; SSB format 305B may map to: SSS, PSS, or a beam index; another SSB format may map to: SSS, PSS, a beam index, an SFN index, or other information; or SSB format 305n may map to full SSB content, including access information. At act 515, on condition of a change criterion being satisfied, RAN 105 may begin transmitting SSB signals according to the format indicated at act 510. In an embodiment, RAN 105 may have transmitted the SSB signal at act 510 on condition of a change criterion having been satisfied.

At act 520, user equipment 115 determines, based on indications received at act 510 and the configuration received at act 505, determined SSB signaling to monitor from RAN 105, and monitors the determined SSB signaling. UE 115 monitors/searches for/decodes resources indicated at act 510 and receives and decodes an SSB signal transmitted by RAN 105 at act 515.

Figure 6:
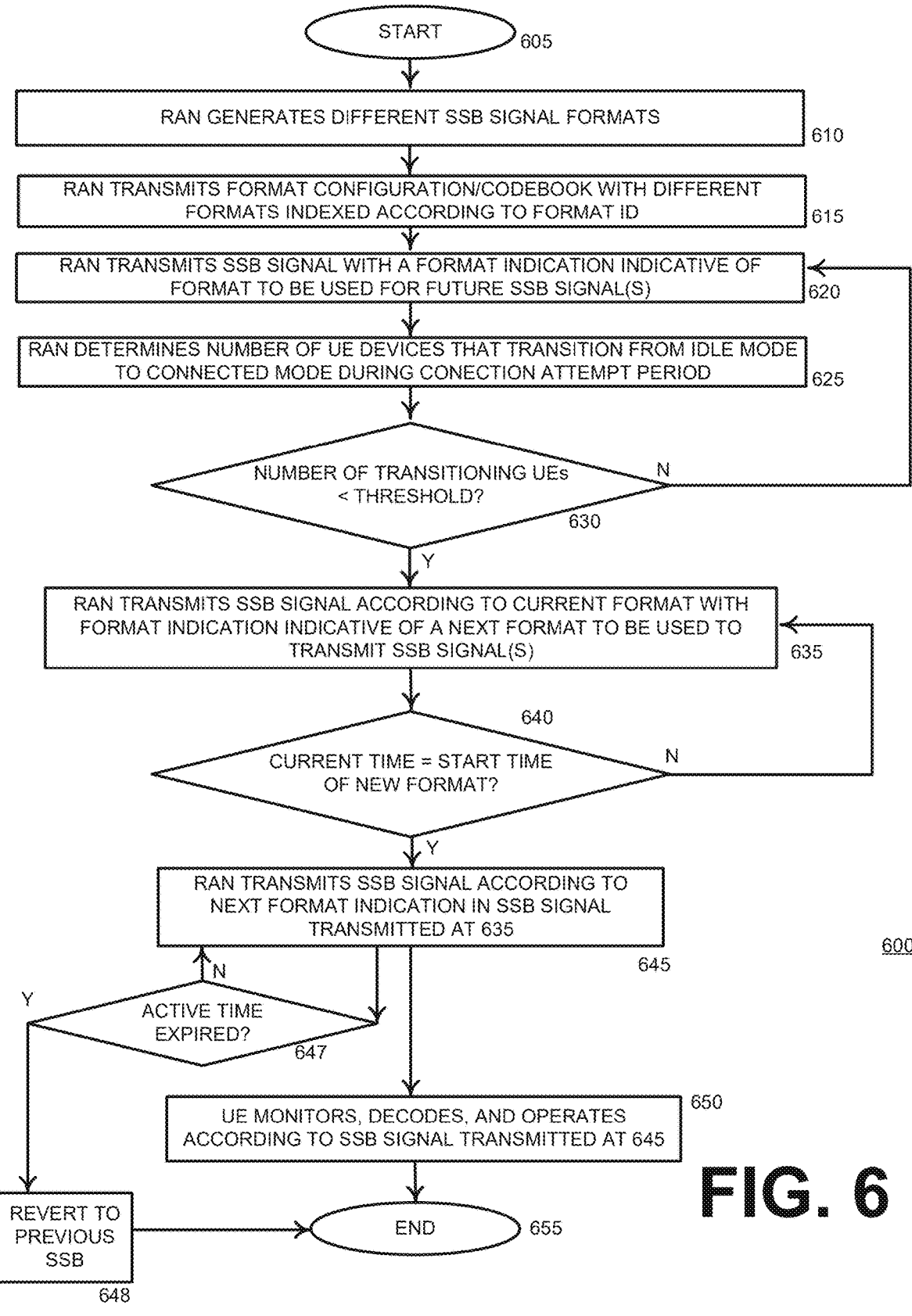
FIG. 6 illustrates flow diagram of an example embodiment method of inter-cell network energy saving mode coordination and cooperation.

Turning now to FIG. 6, the figure illustrates an example embodiment method 600. Method 600 begins at act 605. At act 610, a RAN may receive from a network, such as core network 130 shown in FIG. 1, different SSB signal formats. The different SSB signal formats may be included in a configuration, such as, for example, configuration 400 shown in FIG. 4A, to be delivered to user equipment devices. The different signal formats in the configuration received at act 610 may comprise different signal loading schemes, or different information, or indications of different information, to be used by the user equipment. In an embodiment, the RAN may generate, or modify, formats to be delivered to user equipment based on network conditions that may be specific to a signal coverage area of the RAN. At act 615, the RAN transmits the format configuration, which may be referred to as a code book, with the different formats in the configuration that are indexed on, or associated with, corresponding format identifiers or format indexes. Thus, a user equipment that has received the format configuration may look up a format based on an indication of a format index that may be received by the user equipment in an SSB signal. At act 620, the RAN transmits an SSB signal with a format indication, such as indication 215 described in reference to FIG. 2, FIG. 3A, or FIG. 3B, indicative of a format to be used for future SSB signaling. For example, the RAN may currently be transmitting a fully loaded SSB signal that includes a format indication, which a user equipment that receives the transmitted SSB signal may use to look up in the configuration transmitted at act 615, a format of a future SSB signal that will be transmitted by the RAN. In an embodiment, a format index indicated in a format indication 215 of a given current SSB signal may be an indication for the user equipment to use a format corresponding to the indicated index for purposes of decoding the given current SSB signal.

At act 625, the RAN may determine a number of user equipment devices that have transitioned, or that have attempted to transition, from an idle mode to a connected mode during a connection attempt period. A connection attempt period may be a rolling time window, for example 10 seconds. Thus, in an example, the RAN may be continually determining a number of user equipment that connect to, or attempt to connect to, the RAN during any ten-second period, or any other configured period. At act 630, the RAN may determine whether the number of transitioning user equipment during the connection attempt period determined at act 625 is less than a threshold. For example, if the threshold is ten user equipment devices, and within any ten second period (or other configured period) fewer than ten user equipment connect to, or attempt to connect to, the RAN, the RAN may determine that the criterion/threshold is satisfied and method 600 advances to act 635. If a determination is made at act 630 that more than the threshold number of user equipment connected, or attempted to connect, to the RAN, method 600 may return to act 620.

It will be appreciated that instead of a criterion being a threshold number of user equipment devices attempting to connect to the RAN, a criterion that may be analyzed at act 630 could be an determination by the RAN to transmit emergency information to user equipment or could be a determination by the RAN that user equipment devices that may be camped on the RAN and that use artificial intelligence algorithms to facilitate radio functions may need updated artificial intelligence algorithm data.

At act 635, the RAN may transmit an SSB signal according to a current format, which may have been a format used at act 620 to transmit an SSB signal, with a format indication indicative of a next format to be used by the RAN to transmit SSB signaling. In an embodiment, the format indication may be indicative of a format according to which the current SSB signal was transmitted, which format may be different than a format according to which an immediately preceding SSB was transmitted. The format indication may be indicative of a format that is different than the current format used to transmit the SSB signal at act 635. The format indication in the SSB signal transmitted at act 635 may comprise a starting time at which, or after which, the RAN will transmit one or more SSB signals according to the next format indicated by the format indication in the SB signal transmitted at act 635. In an embodiment, if an indicated starting time is a current time, or indicates zero time offset with respect to a current time corresponding to the SSB signal, the starting time indication may be indicative of a format according to which the current SSB signal was transmitted.

At act 640, the RAN may determine whether a current time, for example a system clock time that is synchronized with the RAN and user equipment within range of the RAN, is equal to the starting time, or later than the starting time indicated in the format indication contained in the SSB signal transmitted at act 635. If a determination made at act 640 is that the current time is not yet the starting time indicated in the SSB signal transmitted at act 635, method 600 returns to act 635.

However, if a determination is made at act 640 that at current time equals the starting time or is after the starting time indicated in the SB signal transmitted at act 635, the RAN may transmit at act 645 an SSB signal according to the next format, which was indicated in the format indication in the SSB signal that was transmitted at act 635. The SSB signal transmitted at act 635 may be referred to as a first SSB signal transmitted according to a first format and the SSB signal transmitted at act 645 may be referred to as a second SSB signal transmitted according to a second format. At act 650, idle-mode user equipment that may be in range of the RAN may monitor and decode the SSB signal transmitted at act 645. The user equipment may perform operations indicated in the SSB signal transmitted at act 645. For example, if the SSB signal transmitted at act 645 is a fully loaded SSB signal, a user equipment that monitors and decodes the SSB signal at act 650 may attempt to connect to the RAN based on access information that may be contained in the USB signal transmitted at act 645. In another example, if the SSB signal transmitted at act 645 does not comprise access information but comprises an indication of an emergency in a content data field of an indicated format indication, the user equipment may generate an emergency alert based on information contained in an SSB signal corresponding to a format indicated in the SSB signal transmitted at act 635. After operating according to information contained in the SSB signal transmitted at act 645, method 600 advances to act 655 and ends.

A first instance of transmitting an SSB signal at act 635 (e.g., control hasn't returned from act 640) may be referred to as transmitting a first first SSB signal according to a current format, which may be referred to as a first first SSB signal being transmitted according to a first format. After advancing to act 645, in addition to a UE potentially receiving at act 650 an SSB signal transmitted at act 645, the RAN may determine at act 647 whether an active period, which may be indicated in a format indication transmitted in the SSB signal transmitted at act 635, has expired. If the active period has not expired, method 600 returns to act 645 and the RAN continues to transmit the SSB signal, which, as discussed above, may be referred to as a second SSB signal transmitted according to a second format (e.g., a format indicated in the SSB signal transmitted at act 635). If a determination is made at act 647 that the active period has expired, method 600 advances to act 648 and the RAN may revert to transmitting SSB signals according to the format that was used in transmitting the SSB signal at act 635. The reverting to transmitting an SSB according to the same format used to transmit an SSB at act 635 may be referred to as transmitting a second first SSB according to the format (first format) used to transmit the SSB signal at act 635.

Turning now to FIG. 7, the figure illustrates an example embodiment method 700 comprising at block 705 transmitting, by a radio access network node comprising a processor, a first synchronization signal block signal, according to a first synchronization signal block format, comprising a first format indication indicative of a second synchronization signal block format; at block 710 transmitting, by the radio access network node, a second synchronization signal block signal according to the second synchronization signal block format; at block 715 wherein the first synchronization signal block signal comprises a non-access information indication indicative of at least synchronization information corresponding to the radio access network node; at block 720 wherein the second synchronization signal block signal comprises the non-access information indication and an access information indication indicative of minimum system information; and at block 725 wherein access information is excluded from the first synchronization signal block signal, and wherein the minimum system information comprises master information block information.

Turning now to FIG. 8, the figure illustrates an example radio access network node, comprising at block 805 a processor configured to receive a synchronization signal block format configuration comprising at least a first synchronization signal block format and a second synchronization signal block format; at block 810 transmit the synchronization signal block format configuration to a user equipment for use by the user equipment during an idle mode of the user equipment; at block 815 transmit a first synchronization signal block signal according to the first synchronization signal block format; at block 820 determine, by the radio access network node, a number of user equipment attempting to connect to the radio access network node during a configured connection attempt period; at block 825 analyze the number of user equipment attempting to connect to the radio access network node during a configured connection attempt period with respect to a connection attempt criterion to result in an analyzed determined connection attempt number; at block 830 based on the analyzed determined connection attempt number being determined to satisfy the connection attempt criterion, transmit a second synchronization signal block signal according to the second synchronization signal block format; and at block wherein the first synchronization signal block signal comprises non-access information and access information, and wherein the second synchronization signal block signal comprises non-access information and does not comprise access information.

Turning now to FIG. 9, the figure illustrates a non-transitory machine-readable medium 900 comprising at block 905 executable instructions that, when executed by a processor of a radio access network node, facilitate performance of operations, comprising transmitting a first first synchronization signal block signal according to a first synchronization signal block format, wherein the first first synchronization signal block signal comprises a first format indication indicative of a second synchronization signal block format; at block 910 based on determining that a synchronization signal block format change criterion has been satisfied, transmitting a second synchronization signal block signal according to the second synchronization signal block format; at block 915 wherein the first synchronization signal block signal comprises non-access information and access information; and at block wherein the second synchronization signal block signal comprises only non-access information, wherein the synchronization signal block format change criterion comprises a connection attempt threshold, wherein the connection attempt threshold is satisfied by a number of user equipment attempting to connect to the radio access network node during a configured connection attempt period being less than the connection attempt threshold, and wherein the second synchronization signal block signal is transmitted at the starting time based on the determined connection attempt number satisfying the connection attempt criterion.

Figure 10:
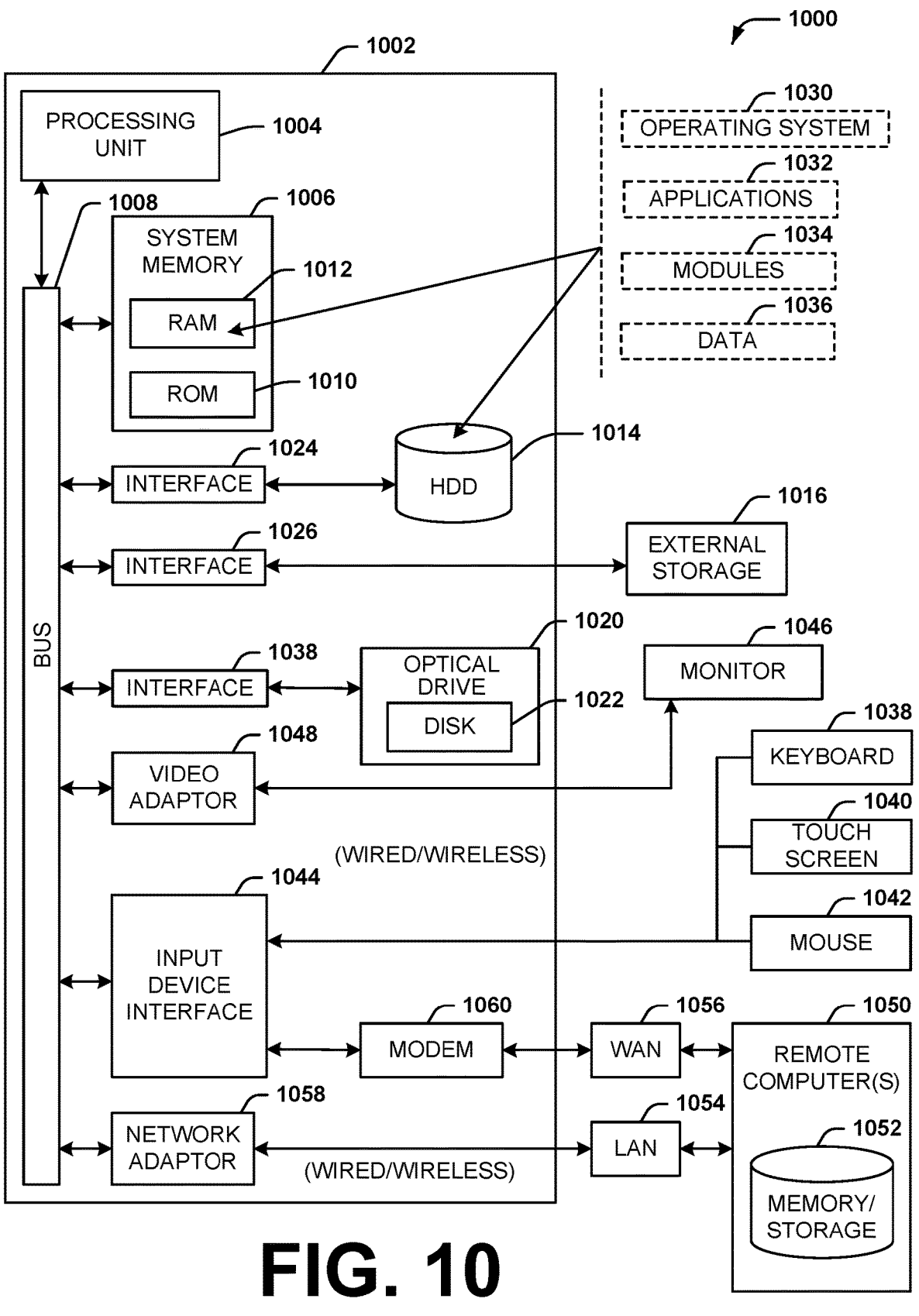
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1010. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/ wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
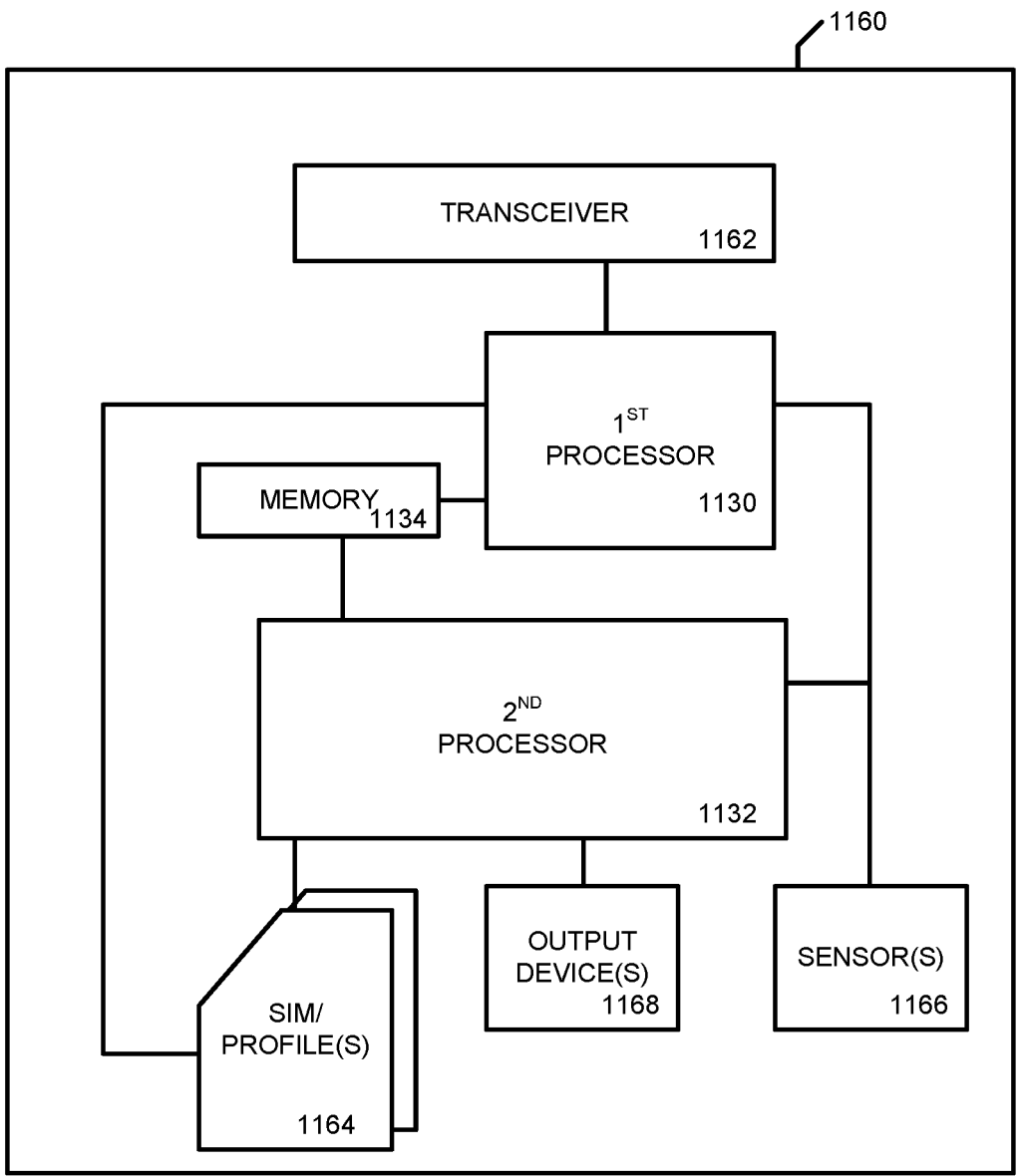
FIG. 11 illustrates a block diagram of an example wireless user equipment.

Turning now to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 34 or a separate memory portion), for facilitating wireless communication with RAN 105 or core network 130 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 30 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/ in a low power state when UE 1160 does not need it for executing applications and processing data related to an application provides an advantage of reducing power consumption when the UE only needs to use the first processor portion 1130 while in listening mode for monitoring routine configured bearer management and mobility management/ maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, that are external to UE 1160.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| Qos | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |

TABLE 1-continued

| Term | Definition |
| --- | --- |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| PSS | Primary synchronization signal |
| SSS | Secondary synchronization signal |
| DMRS | Demodulation reference signal |
| SFN | System frame number |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

transmitting, by a radio access network node comprising at least one processor, a first synchronization signal block signal, according to a first synchronization signal block format, comprising a first format indication indicative of a second synchronization signal block format; and transmitting, by the radio access network node, a second synchronization signal block signal according to the second synchronization signal block format, wherein the first synchronization signal block signal comprises a non-access information indication at least indicative of synchronization information corresponding to the radio access network node, wherein the synchronization information comprises primary synchronization signal information, and wherein the primary synchronization signal information temporally precedes the first format indication in the first synchronization signal block signal.

2. The method of claim 1, wherein the first format indication comprises at least one of: a format index corresponding to the second synchronization signal block format, a starting time indication indicative of an occasion of transmitting the second synchronization signal block signal according to the second synchronization signal block format, an active period indication indicative of an active period during which the radio access network node is to transmit the second synchronization signal block signal according to the second synchronization signal block format, or a transmission periodicity indication indicative of a periodicity at which the radio access network node is to transmit the second synchronization signal block signal according to the second synchronization signal block format.

3. The method of claim 1, wherein the second synchronization signal block signal comprises the non-access information indication and an access information indication indicative of minimum system information.

4. The method of claim 3, wherein access information is excluded from the first synchronization signal block signal, and wherein the minimum system information comprises master information block information.

5. The method of claim 1, wherein the second synchronization signal block signal comprises a second format indication indicative of a third synchronization signal block format, the method further comprising:

transmitting, by the radio access network node, a third synchronization signal block signal according to the third synchronization signal block format.

6. The method of claim 5, wherein the first synchronization signal block format, the second synchronization signal block format, and the third synchronization signal block format are different.

7. The method of claim 5, wherein the third synchronization signal block signal comprises a content indication indicative of content data, other than non-access information or access information, in the third synchronization signal block signal.

8. The method of claim 7, wherein the content data comprises advertisement information to be rendered via a user equipment.

9. The method of claim 7, wherein the content data comprises emergency alert information to be rendered via a user equipment.

10. The method of claim 7, wherein the content data comprises at least one of: calibration data to be used by a user equipment to calibrate a radio function of the user equipment, a beam indication corresponding to the transmitting of the third synchronization signal block signal, or timing information corresponding to the radio access network node.

11. A non-transitory machine-readable medium, comprising executable instructions that, when executed by at least one processor of a radio access network node, facilitate performance of operations, comprising:

transmitting a first first synchronization signal block signal according to a first synchronization signal block format, wherein the first first synchronization signal block signal comprises a first format indication indicative of a second synchronization signal block format; and based on determining that a synchronization signal block format change criterion has been satisfied, transmitting a second synchronization signal block signal according to the second synchronization signal block format, wherein the first first synchronization signal block signal comprises non-access information and access information, wherein the first format indication comprises a starting time indication indicative of a starting time of a first transmitting of the second synchronization signal block signal according to the second synchronization signal block format, wherein the first format indication further comprises an active period indication indicative of an active period during which the radio access network node is to transmit the second synchronization signal block signal according to the second synchronization signal block format, and wherein the operations further comprise:

transmitting the second synchronization signal block signal at the starting time; and after expiration of the active period, transmitting a second first synchronization signal block signal according to the first synchronization signal block format.

12. The non-transitory machine-readable medium of claim 11, wherein the second synchronization signal block signal comprises only non-access information, wherein the synchronization signal block format change criterion comprises a connection attempt threshold, wherein the connection attempt threshold is satisfied by a determined connection attempt number of user equipment attempting to connect to the radio access network node during a configured connection attempt period being less than the connection attempt threshold, and wherein the second synchronization signal block signal is transmitted at the starting time based on the determined connection attempt number satisfying the connection attempt threshold.

13. A radio access network node, comprising at least one processor configured to process executable instructions that, when executed by the at least one processor, facilitate performance of operations, comprising:

transmitting, to at least one user equipment, a synchronization signal block format configuration comprising at least a first synchronization signal block format and a second synchronization signal block format to be usable by the at least one user equipment operating according to an idle mode;

transmitting, to the at least one user equipment, a first synchronization signal block signal, according to the first synchronization signal block format, comprising a first format indication indicative of the second synchronization signal block format;

transmitting, to the at least one user equipment, a second synchronization signal block signal, according to the second synchronization signal block format, wherein the first format indication is further indicative of synchronization information corresponding to the radio access network node, wherein the synchronization information comprises primary synchronization signal information, and wherein the primary synchronization signal information temporally precedes the first format indication in the first synchronization signal block signal.

14. The radio access network node of claim 13, wherein the operations further comprise:

determining a number of the at least one user equipment attempting to connect to the radio access network node during a configured connection attempt period to result in determined connection attempt number; and analyzing the determined connection attempt number with respect to at least one connection attempt criterion to result in an analyzed determined connection attempt number, wherein the transmitting of the second synchronization signal according to the second synchronization signal format is based on the analyzed determined connection attempt number being determined to satisfy the at least one connection attempt criterion.

15. The radio access network node of claim 13, wherein the first synchronization signal block signal comprises non-access information and access information, and wherein the second synchronization signal block signal comprises non-access information and does not comprise access information.

16. The radio access network node of claim 13, wherein the second synchronization signal block signal comprises at least one content indication indicative of content data.

17. The radio access network node of claim 16, wherein the content data comprises at least one of: at least one marketing information indication, at least one advertising information indication, or at least one emergency information indication.

18. The radio access network node of claim 16, wherein the at least one content indication is to be usable by the at least one user equipment to look up, in at least one code-book, the content data.

19. The method of claim 1, wherein the second synchronization signal block signal comprises parameter information corresponding to at least one artificial intelligence learning model to be usable by at least one user equipment to update the at least one artificial intelligence learning model.

20. The non-transitory machine-readable medium of claim 11, wherein the second synchronization signal block signal comprises parameter information corresponding to at least one artificial intelligence learning model to be usable by at least one user equipment to update the at least one artificial intelligence learning model.

* * * * *